United States Patent
Laselva et al.

(10) Patent No.: US 11,979,237 B2
(45) Date of Patent: May 7, 2024

(54) METHODS OF PACKET COMBINING FOR PACKET DUPLICATION

(71) Applicant: Nokia Technologies Oy, Espoo (FI)

(72) Inventors: Daniela Laselva, Klarup (DK); Frank Frederiksen, Klarup (DK); Klaus Hugl, Vienna (AT); Marco Centenaro, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 363 days.

(21) Appl. No.: 17/602,267

(22) PCT Filed: Apr. 30, 2020

(86) PCT No.: PCT/IB2020/054117
§ 371 (c)(1),
(2) Date: Oct. 7, 2021

(87) PCT Pub. No.: WO2020/222175
PCT Pub. Date: Nov. 5, 2020

(65) Prior Publication Data
US 2022/0166560 A1    May 26, 2022

Related U.S. Application Data

(60) Provisional application No. 62/842,291, filed on May 2, 2019.

(51) Int. Cl.
*H04B 7/00* (2006.01)
*H04L 1/08* (2006.01)
(Continued)

(52) U.S. Cl.
CPC .............. *H04L 1/1822* (2013.01); *H04L 1/08* (2013.01); *H04L 1/1864* (2013.01)

(58) Field of Classification Search
CPC ........ H04L 1/1822; H04L 1/08; H04L 1/1864
See application file for complete search history.

(56) References Cited

U.S. PATENT DOCUMENTS

| 10,693,596 | B2* | 6/2020 | Liu | H04L 1/1614 |
| 2015/0049705 | A1* | 2/2015 | Feuersaenger | H04W 72/541 |
| | | | | 370/329 |

(Continued)

FOREIGN PATENT DOCUMENTS

| EP | 2159949 A2 * | 3/2010 | ........... H04L 1/1887 |
| WO | 2020/001773 A1 | 1/2020 | |
| WO | 2020/120825 A1 | 6/2020 | |

OTHER PUBLICATIONS

"New WID: Support of NR Industrial Internet of Things (IoT)", 3GPP TSG RAN Meeting #83, RP-190728, Agenda: 9.1.2, Nokia, Mar. 18-21, 2019, 6 pages.

(Continued)

*Primary Examiner* — Erika A Washington
(74) *Attorney, Agent, or Firm* — Robert P. Michal, Esq.; Carter, DeLuca & Farrell LLP

(57) ABSTRACT

Systems, methods, apparatuses, and computer program products for packet combining for PDCP duplication, e.g., in ultra-reliable low-latency-communication (URLLC) scenarios are provided. One method may include providing, from a network node to at least one second node, a pointer to an earlier or first transmission of a protocol data unit (PDU). The pointer may be used by subsequent transmissions of the protocol data unit (PDU) through the at least one second node to indicate to a user equipment (UE) what transmissions are to be combined.

13 Claims, 10 Drawing Sheets

(51) Int. Cl.
  *H04L 1/1822* (2023.01)
  *H04L 1/1829* (2023.01)

(56) References Cited

U.S. PATENT DOCUMENTS

2018/0227084 A1* 8/2018 Lu .................... H04B 7/022
2018/0242231 A1  8/2018 Reial et al.
2018/0248659 A1* 8/2018 You ................... H04L 1/1896
2019/0098640 A1  3/2019 Holakouei et al.

OTHER PUBLICATIONS

"3rd Generation Partnership Project; Technical Specification Group Radio Access Network; Study on NR Industrial Internet of Things (IoT); (Release 16)", 3GPP TR 38.825, V1.0.0, Mar. 2019, pp. 33 pages.
"Selective DL PDCP duplication for URLLC", 3GPP TSG-RAN WG3 Meeting #103-bis, R3-191223, Agenda: 17.2.3, Nokia, Apr. 8-12, 2019, 4 pages.
"3rd Generation Partnership Project; Technical Specification Group Radio Access Network; NR; Medium Access Control (MAC) protocol specification (Release 15)", 3GPP TS 38.321, V15.4.0, Dec. 2018, pp. 1-77.
"Discontinuous transmission on Scell for LAA", 3GPP TSG RAN WG1 Meeting #79, R1-144626, Agenda: 6.3.2.2, CATT, Nov. 17-21, 2014, 3 pages.
"Feature lead summary of HARQ enhancement in NR-U", 3GPP TSG RAN WG1 Meeting #95, R1-1814146, Agenda: 7.2.2.4.3, Huawei, Nov. 12-16, 2018, 15 pages.
"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340, V15.4.0, Dec. 2018, pp. 1-67.
"3rd Generation Partnership Project; Technical Specification Group Radio Access Network; Study on New Radio (NR) access technology (Release 14)", 3GPP TR 38.912, V14.1.0, Jun. 2017, pp. 1-74.
Hytonen et al., "Coordinated multi-cell resource allocation for 5G ultra-reliable low latency communications", European Conference on Networks and Communications (EuCNC), Jun. 12-15, 2017, 5 pages.
"Discussion on the RAN2 Ls on TSN requirements evaluation", 3GPP TSG RAN WG1 Ad-Hoc Meeting 1901, R1-1900935, Agenda: 7.2.6.4, Nokia, Jan. 21-25, 2019, 15 pages.
International Search Report and Written Opinion received for corresponding Patent Cooperation Treaty Application No. PCT/IB2020/054117, dated Jul. 28, 2020, 14 pages.
"URLLC data process in user plane", 3GPP TSG-RAN2 Meeting #NR_AHs, R2-1700173, Agenda: 3.2.1.1, Huawei, Jan. 16-20, 2017, 4 pages.

* cited by examiner

METHODS OF PACKET COMBINING FOR PACKET DUPLICATION

RELATED APPLICATION

This application claims priority to PCT Application No. PCT/IB2020/054117, filed on Apr. 30, 2020, which claims priority to U.S. Application No. 62/842,291, filed on May 2, 2019, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods of packet combining for packet data convergence protocol (PDCP) duplication, e.g., in ultra-reliable low-latency-communication (URLLC) scenarios.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR provides bitrates on the order of 10-20 Gbit/s or higher, and can support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

An embodiment is directed to a method that may include providing, from a network node to one or more second node(s) a pointer to an earlier or first transmission of a PDU.

Another embodiment is directed to an apparatus that may include at least one processor and at least one memory comprising computer program code. The at least one memory and computer program code may be configured, with the at least one processor, to cause the apparatus at least to provide to one or more second node(s) a pointer to an earlier or first transmission of a PDU.

Another embodiment is directed to an apparatus that may include providing means for providing to one or more second node(s) a pointer to an earlier or first transmission of a PDU.

According to a variant, the method may be performed by a network node (e.g., gNB) operating in a functional split in which the network node may include a control unit (gNB-CU) and a plurality of distributed units (gNB-DUs), where each DU may be associated with a component carrier. In this example, the method may include the CU or a DU providing the pointer to one or more of the DUs or vice versa over a F1 interface. Therefore, in some examples discussed herein, the first node may represent a gNB-CU or a gNB-DU, and the second node may represent one or more gNB-DUs.

In a variant, the pointer may be used by subsequent transmissions of the PDU through the second node(s) to indicate to the UE what transmissions are to be combined. In a variant, the providing may include providing the pointer to the second node(s) over a X2 and/or Xn and/or F1 interface. According to a variant, the pointer may be a HARQ process ID used by the first node for earlier transmission(s) of the PDU. In additional variants, the pointer may also include one or more of a RV to be used at the second node(s), a NDI value used at the first node for the earlier transmission of the PDU, the PDU of the first node for the earlier transmission to the UE to prepare for the second node transmission, and/or a timing/timestamp of transmission from the first node to the second node(s).

According to some variants, when a notification of a transmission failure of the PDU is received by the first node from the UE, the providing may include providing to the second node(s) the PDU duplicate, the pointer to the earlier PHY transmission of the PDU, an urgent scheduling indication, and/or failure indication of the PDU.

In another variant, the providing may include providing to the second node(s) the PDU duplicate, along with a hold-on time indication, the HARQ information associated with the PDU duplicate and, upon a transmission failure of the PDU from the first node, sending an urgent scheduling indication to the second node(s) and/or failure indication of the PDU.

In yet another variant, the method may include the first node sending a UE's PUCCH configuration(s) to the second node, allowing a UCI with failure indication over the first node's PUCCH to be received at the first node and second node from the UE.

In another variant, the method may include determining and/or selecting which HARQ process IDs the first node will use for the UE and indicating the selected HARQ process IDs to the second node.

In a variant, for the cases when RLC segmentation occurs at the first node, the method may include providing information about the segmentation and the RLC sequence number over Xn, X2 and/or F1 interface to the second node.

In a variant, in cases where MAC multiplexing was used, the method may include providing information on the MAC multiplexing to the second node to enable the same MAC multiplexing to take place at the second node.

According to some variants, the method may also include instructing the UE to operate in PDCP duplication with soft-combining mode.

Another embodiment is directed to a method that may include receiving, at a second node from a first node, a pointer to an earlier or first transmission of a PDU. The method may include using the pointer by subsequent transmissions of the PDU through the second node to indicate to the UE what transmissions are to be combined.

Another embodiment is directed to an apparatus that may include at least one processor and at least one memory comprising computer program code. The at least one memory and computer program code may be configured, with the at least one processor, to cause the apparatus at least to receive, from a first node, a pointer to an earlier or first transmission of a PDU, and to use the pointer by subsequent transmissions of the PDU through the second node to indicate to the UE what transmissions are to be combined.

Another embodiment is directed to an apparatus that may include receiving means for receiving, from a first node, a pointer to an earlier or first transmission of a PDU, and using means for using the pointer by subsequent transmissions of the PDU through the second node to indicate to the UE what transmissions are to be combined.

In a variant, the receiving may include receiving the pointer over a X2 and/or Xn and/or F1 interface. According to a variant, the pointer may be a HARQ process ID used by the first node for earlier transmission of the PDU. In additional variants, the pointer may also include one or more of a RV to be used at the second node, a NDI value used at the first node for the earlier transmission of the PDU, the PDU of the first node for the earlier transmission to the UE to prepare for the second node transmission, and/or a timing/timestamp of transmission from the first node to the second node.

According to a variant, when a notification of a transmission failure on a primary link is received by the first node from a UE, the receiving may include receiving the PDU duplicate, the pointer to the earlier transmission of the PDU, an urgent scheduling indication, and/or failure indication of the PDU.

In another variant, the receiving may include receiving the PDU duplicate, along with a hold-on time indication, the HARQ information associated with the PDU duplicate and, upon a transmission failure of the PDU from the first node, receiving an urgent scheduling indication from the first node, and/or failure indication of the PDU.

In another variant, the receiving may include receiving the PDU duplicate, along with a hold-on time indication and the HARQ process ID used at the first node when the PDU is assigned to that HARQ process ID.

According to a variant, the method may also include indicating to a UE that a HARQ process ID used by the first node is actually associated with the second node. In a variant, the indicating may include reserving a subset of the second node's HARQ process IDs to be associated to HARQ process IDs received from the first node, mapping first node's HARQ process IDs to the second node's HARQ process IDs, and indicating this mapping of HARQ process IDs to the UE.

In another variant, the indicating may include explicitly indicating the information that the HARQ process ID used by the first node is associated with the second node as part of the DCI. In yet another variant, the indicating may include using a shadow RNTI or the first node C-RNTI to target the DCI for the UE.

In yet another variant, the method may include the second node receiving, from the first node, a UE's PUCCH configuration(s), allowing a UCI with failure indication over the first node's PUCCH to be received at the first node and second node from the UE.

In another variant, the method may include the second node receiving an indication of which HARQ process IDs the first node will use for the UE.

In a variant, for the cases when RLC segmentation occurs at the first node, the method may include the second node receiving information about the segmentation and the RLC sequence number over the Xn, X2 and/or F1 interface.

In a variant, in cases where MAC multiplexing was used, the method may include the second node receiving information on the MAC multiplexing from the first node to enable the same MAC multiplexing to take place at the second node.

In a variant, the method may include the second node receiving the UE's PUCCH configurations from the first node and, based on the received PUCCH configuration, the second node listening to the UCI with failure indication sent by the UE over the first node's PUCCH.

In a further variant, in a case where the UE sends two UCIs, the method may include the second node assigning PUCCH resources to the UE associated to transmissions from the first node.

In another variant, the method may include the second node receiving, from the first node, the UE's PUCCH configurations and adopting a second receiver to listen to the first node's PUCCH.

Another embodiment is directed to a method that may include receiving, at a UE, an indication from a second node that a HARQ process ID used by a first node is actually associated with the second node.

Another embodiment is directed to an apparatus that may include at least one processor and at least one memory comprising computer program code. The at least one memory and computer program code may be configured, with the at least one processor, to cause the apparatus at least to receive an indication from a second node that a HARQ process ID used by a first node is actually associated with the second node.

Another embodiment is directed to an apparatus that may include receiving means for receiving an indication from a second node that a HARQ process ID used by a first node is actually associated with the second node.

In a variant, the receiving may include receiving an indication of an association or mapping of HARQ process IDs to the first node. In another variant, the receiving may include receiving an explicit indication of the information that the HARQ process ID used by the first node is associated with the second node as part of the DCI. In another variant, the receiving may include receiving a shadow RNTI or the first node C-RNTI to target the DCI for the UE. In some variants, the receiving may also include receiving an indication to associate the shadow RNTI with the first node, before using the shadow RNTI to target the DCI.

In a variant, the method may include monitoring the DCI sent by the second node targeted to (scrambled with) the shadow RNTI. This may be done in addition to monitoring for potential DCIs targeted to the UE identifiers specific to the second node (e.g., the second node's C-RNTI).

In a variant, the method may also include attempting to decode duplicate PDU transmission(s) received from the second node having an HARQ process ID associated with the first node, and combining said duplicate transmissions from the second node with duplicate transmissions received from the first node with an associated HARQ process ID.

In a variant, the method may also include the UE sending one UCI with failure indication over the first node's PUCCH. In this case, the second node may adopt a second receiver to listen to the first node's PUCCH. For this, the first node may send the UE's PUCCH configurations to the second node.

In a variant, the method may also include the UE sending two UCI with failure indication, with one UCI being sent over the first node's PUCCH and one UCI being sent over the second node's PUCCH. In this case, the UE may have been configured, by the second node, with PUCCH resources associated to the transmissions of the first node.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for packet combining for PDCP duplication, e.g., in URLLC scenarios, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

As will be discussed in more detail below, certain embodiments may relate to industrial internet of things (IIoT) in NR. For example, some embodiments may relate to NR enhancements to URLLC and IIoT as captured in 3GPP technical report (TR) 38.825.

Some objectives for PDCP duplication enhancements include specifying PDCP duplication with up to 4 radio link control (RLC) entities configured by radio resource control (RRC) in architectural combinations including carrier aggregation (CA), and NR-dual connectivity (DC) in combination with CA, specifying mechanisms relating to dynamic control of how a set or subset of configured RLC entities or legs are used for PDCP duplication, specifying activation/deactivation mechanisms of PDCP duplication with UE-based criteria and/or gNB-control, specifying enhancements for more efficient downlink (DL) PDCP duplication in NR-DC case, and/or specifying enhancements to address potential impacts of higher-layer multi-connectivity based on SA2 progress and request.

Figure 1A:
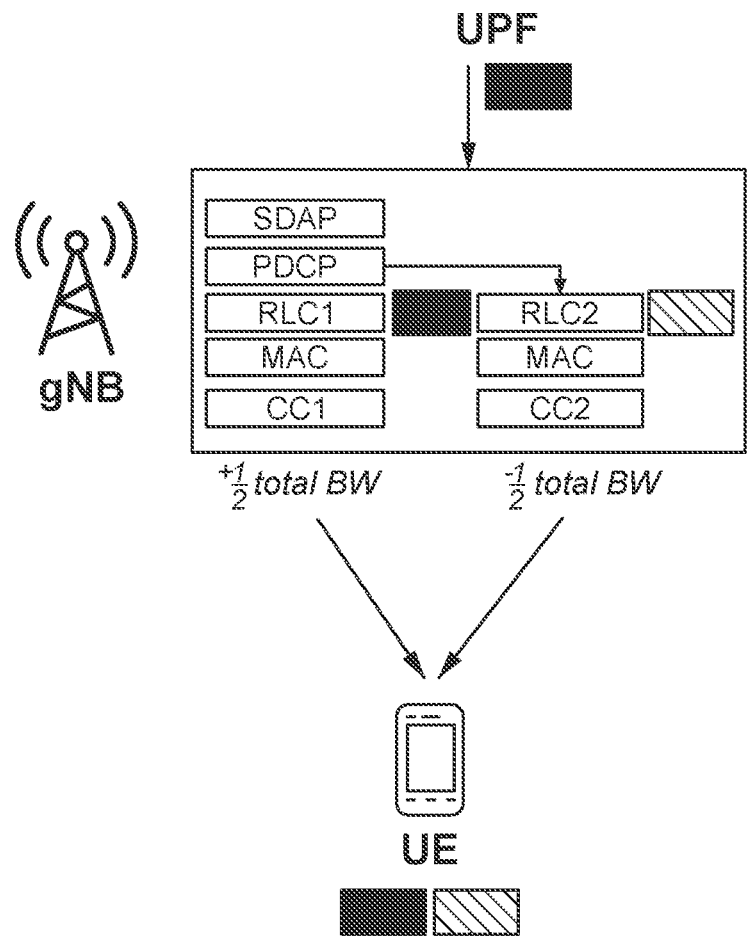
FIG. 1a illustrates an example system diagram of PDCP duplication in the downlink through carrier aggregation (CA)
Figure 1B:
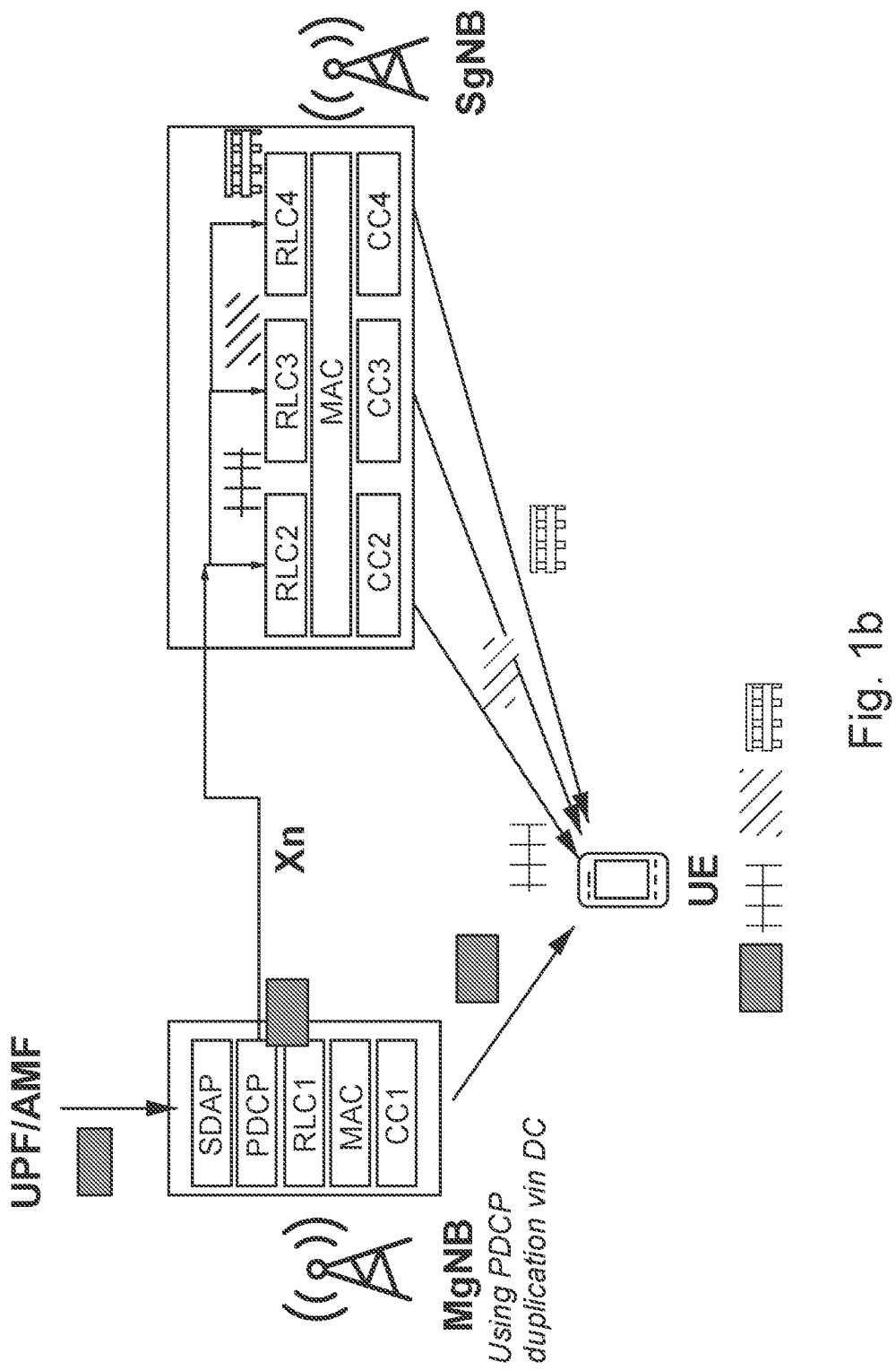
FIG. 1b illustrates an example system diagram of PDCP duplication in the downlink through dual connectivity (DC)

Data duplication at PDCP layer is considered an enabler of the IIoT paradigm. Indeed, PDCP data duplication offers transmit diversity boosting and thereby lowers the error probability for the duplicated packet, as errors occurring on two transmission paths are typically uncorrelated at a certain degree. PDCP data duplication is supported in 3GPP Release-15 either across distinct component carriers (CCs) in the same network node (i.e., when combined to CA) or across two distinct nodes (i.e., when combined to DC). Moreover, in future releases multi-connectivity (MC) may be also considered. MC allows for use of more-than-two nodes at a time and/or more-than-two radio links to be involved in the transmission/reception operations towards a UE, for instance where the radio links are a combination of DC and CA. FIG. 1a illustrates an example system diagram of PDCP duplication in the downlink through CA, and FIG. 1b illustrates an example system diagram of PDCP duplication in the downlink through DC (e.g., assuming more than one associated RLC entity at the secondary node).

In PDCP duplication, the data is duplicated at the PDCP layer, transmitted independently via the two radio paths and aggregated at the receiver PDCP layer, resulting in an improvement of the achieved reliability. It is therefore a potential solution for URLLC application. The next generation node B (gNB), which is in control of the PDCP duplication may be called the hosting node as it hosts the PDCP entity, whereas any other gNB serving duplicated PDCP packets for a given UE may be termed as the assisting node (only one assisting node is supported in Release-15, and the same assumption is made in Release-16). When a packet arrives at the hosting gNB node, it is duplicated at the PDCP entity and forwarded over the Xn interface to the gNB node(s) hosting the associated RLC entity or entities. The same data packet (i.e., PDCP PDU with a given sequence number) may then be independently transmitted over to the same UE through the multiple different links (via both gNBs).

In addition to the transmission diversity introduced by PDCP packet duplication, further reliability improvement can be harnessed by soft combining of the independently transmitted data packets, like in hybrid automatic repeat request (HARQ)-based combining. This, however, requires some level of coordination between the participating transmitting nodes and signalling to the receiving UE. Such a feature is not available in the current 5G NR DC/MC specification. Indeed, whenever a UE does not correctly receive a packet from any of the nodes, the opportunity to improve the decoding probability of the packet by combining the two or more transmissions carrying copies of the same packet is currently not utilized. Doing so can improve the transmission reliability and reduce the latency, which are important at least for URLLC services.

Certain embodiments aim to support a soft-combining method, which is more in line with native HARQ mechanism in NR and therefore have less specification impact. Although some embodiments may be applicable to NR-DC and multiple radio access technology (multi-RAT) DC, in the following example embodiments will be presented in the context of NR-DC (aka NR-NR DC).

In PDCP duplication, packet duplicates are detected first at the PDCP layer based on having the same sequence number. Instead, at lower layer (PHY), the receiver has no means to detect duplicates and, therefore, no combining of duplicates at physical layer can be performed as per Release-15. As will be discussed below, an embodiment provides HARQ operation enhancements to enable soft combing, for example, together with selective PDCP duplication upon packet failure.

Basic soft combining is used for example in HARQ operations, which are intra-node operation and in which there is no ambiguity for the UE in terms of what transmissions to combine and when. Essentially, HARQ is an error-controlling technique and primarily allows for soft combining. Soft combining is achieved by having each HARQ process associated with a HARQ buffer. In case of transmission failure, the HARQ process stores the related MAC PDU in the associated HARQ buffer and combines it with any new transmission for the same transport block (TB) (i.e., retransmission).

Currently, a UE's MAC entity operates with multiple HARQ processes per each carrier, according to the maximum number of HARQ processes (e.g., 16). The network conveys the HARQ information associated to a transmission over a CC in the downlink control information (DCI) such that the UE can buffer the packet at the right HARQ buffer enabling soft combining. The HARQ information for downlink shared channel (DL-SCH) or for uplink shared channel (UL-SCH) transmissions may include the HARQ process number/ID, New Data Indicator (NDI) (X for original data (X=0 or 1) and X for any corresponding retransmission, i.e., the NDI is not toggled across the retransmission process), and Redundancy Version (RV, 0 for original data and incrementing RV value for retransmissions).

Figure 2A:
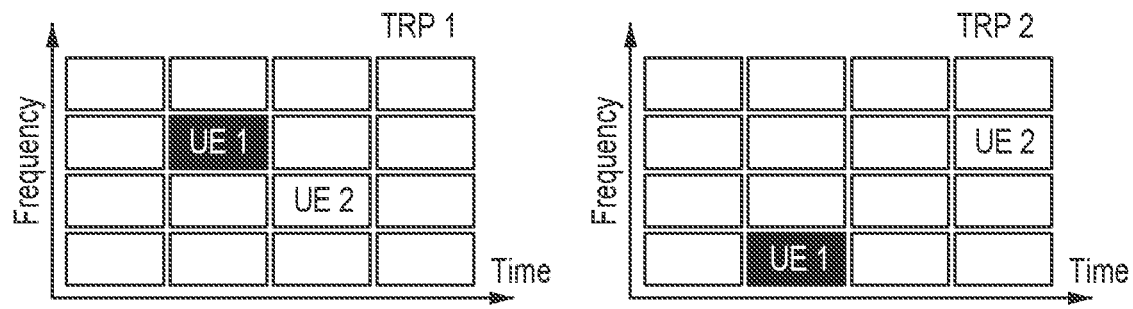
FIG. 2a illustrates an example of non-coherent JT-CoMP time-frequency resource allocation.
Figure 2B:
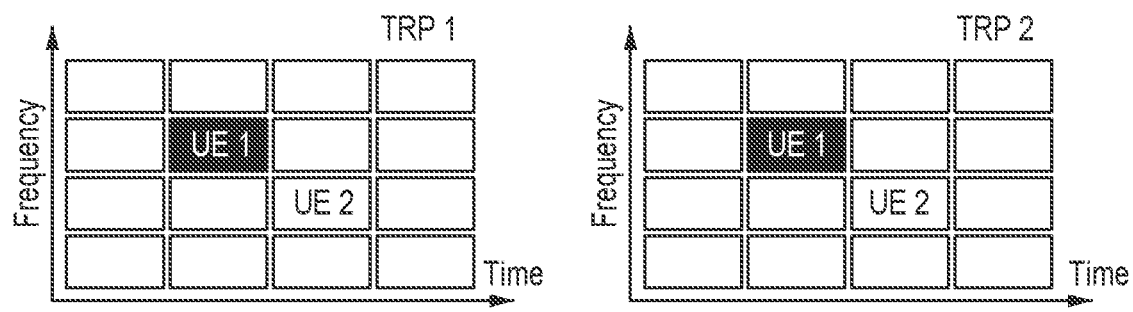
FIG. 2b illustrates an example of SFN time-frequency resource allocation.

Several techniques for achieving joint transmission (JT) can be considered with the aim of increasing URLLC reliability, namely Single-Frequency Network (SFN), coherent JT-CoMP and non-coherent JT-CoMP, as illustrated in FIGS. 2a and 2b. More specifically, FIG. 2a illustrates an example of non-coherent JT-CoMP time-frequency resource allocation, and FIG. 2b illustrates an example of SFN time-frequency resource allocation.

In view of the above, certain embodiments may provide a pointer to the first PHY transmission of a PDU transmitted from a first or primary node (e.g., the hosting node) to a secondary node (e.g., assisting node). The pointer may then be used by subsequent transmission(s) of the PDU through the secondary node (e.g., the assisting node) to indicate to a receiver (e.g., UE) which transmissions are to be combined, and therefore allow soft combining at the receiver.

More specifically, in an embodiment, the first node may provide to a second node the pointer to an earlier or first PHY transmission of a given PDU, which may be transferred over the X2/Xn interface. In one example, the pointer may have the form of the HARQ Process ID used by the first node for the earlier transmission of the PDU. Then, the second node may use the pointer for any subsequent transmission(s) of the PDU to indicate to the UE that the transmission can be associated with the information already stored in the corresponding HARQ buffer indicated by the HARQ process ID, thereby allowing soft combining at the receiver. It is noted that, in some embodiments, it may be assumed that the MAC/RLC PDU formats are the same at both nodes (i.e., at both the first node and the second node), which ensures that the receiver (e.g., UE) can combine the soft values of the PDUs.

According to some embodiments, URLLC may use RLC unacknowledged mode (UM) because there is no time for the RLC-level retransmissions enabled by the RLC acknowledged mode (AM). The RLC UM does not make use of sequence numbers, with the exception of the packets which are segmented. RLC segmentation may not occur too often because URLLC's payload may be rather small (e.g., 10-50 byte). For the cases when RLC segmentation occurs at the first node, information about the segmentation and the RLC sequence number may be provided over Xn interface to the second node.

It is noted that certain embodiments may be expanded to multiple secondary nodes, which would each reserve resources for potential reliability improving retransmissions. However, some embodiments described herein may consider a single secondary supporting node for retransmissions.

As will be discussed in more detail below, certain embodiments are configured to provide new information transfer over X2/Xn to enable soft-combining, to provide new HARQ mapping between a first, master node (MN) and a secondary node (SN), e.g., via partitioning and associated UE configuration, and to provide new UE operations in MAC/HARQ for combining transmissions across different nodes.

Figure 3:
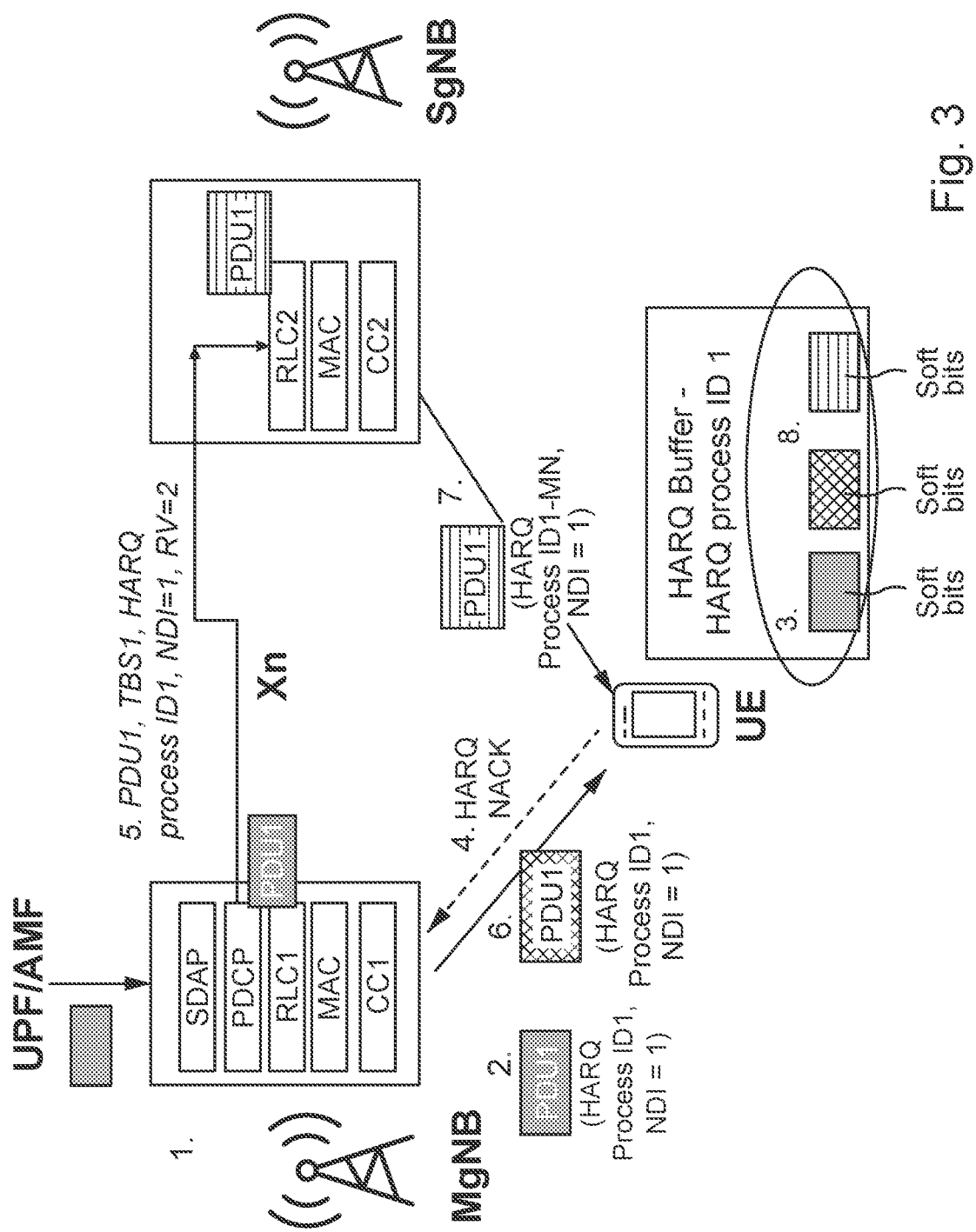
FIG. 3 illustrates an example schematic diagram of a system, according to one example embodiment.

FIG. 3 illustrates an example schematic diagram of a system, according to one example embodiment. In the example of FIG. 3, initially DC may be setup for a UE requesting URLLC service. In an embodiment, at 1, the master node (MgNB) may determine the benefit of 'selective duplication upon failure' and start using it. In this example, at 2, the master node (MgNB) may send PDU1 to UE indicating in DCI 'original data' and 'association to HARQ process ID1'. In this example, at 3, the UE cannot decode PHY transmission carrying PDU1 and stores soft bits in the corresponding HARQ buffer. At 4, the UE may send HARQ feedback indicating NACK to the master node (MgNB). According to an example, at 5, upon reception of NACK, the master node (MgNB) may duplicate PDU1 and transfer PDU1 with HARQ process ID1 to the secondary node (SgNB). Then, at 6, the master node (MgNB) may retransmit PDU1. In this example, at 7, the secondary node (SgNB) may transmit PDU1 to the UE indicating in DCI 'HARQ process ID1 of MgNB', NDI=1 (i.e., non-original data so untoggled NDI) and RV=2. In an embodiment, at 8, the UE may attempt decoding of new transmissions associated to HARQ process ID1 from both the master node and secondary node and, if failing, the UE may combine any data in HARQ process ID1, combining transmissions from both nodes.

In an embodiment, in order to enable the UE to perform soft combining of transmissions from a secondary node (SN) with transmissions from a master node (MN), the MN may provide to the SN the HARQ process ID, redundancy version (RV), NDI value, and/or PDU. This information may be provided to the SN via X2/Xn interface to prepare its transmission and/or inform the UE accordingly.

According to an embodiment, the HARQ process ID that may be provided to the SN is the HARQ process ID used at MN for the earlier transmission to the UE, to be used in the DCI carrying the scheduling grant from the SN. In an embodiment, the RV that may be provided to the SN is the RV to be used at SN. For example, RV=2, assuming that RV=0 and RV=1 are used for the first transmission and first retransmission by MN, respectively. It should be noted that the redundancy version to use for initial transmissions and retransmissions may be implementation dependent and selected according to scheduling preferences.

In one example, the NDI value that may be provided to the SN may be the NDI value used at MN for the earlier transmission to the UE for the PDU, as the SN transmission of the PDU—as any other retransmissions, should use the same NDI value. In one embodiment, the UE may assume that by being scheduled on a specific HARQ process ID, such scheduling will only carry retransmissions (that is, this data would automatically be assumed to be retransmissions when scheduled from a secondary node on a selected set of HARQ process IDs).

In an embodiment, the PDU that may be provided to the SN may be the PDU of the MN for the earlier transmission to the UE to be used to prepare for the SN transmission. Further, one embodiment may provide timing/timestamp of transmission from MN to SN.

In legacy operations, both the MgNB and SgNB can use the entire range of HARQ process IDs (ranging from 0 to the maximum number, e.g. 16, minus one) for their own transmissions. That is, the HARQ process ID is component carrier/cell specific from UE perspective, and therefore the HARQ process IDs is MgNB and SgNB specific (i.e., transmission nodes specific) as different component carriers are used for communication. In one embodiment, it may be indicated to the UE that an HARQ process ID used by a first node is associated actually to a second (different) node. According to certain embodiments, this can be achieved by having the SN reserve a subset of its HARQ process identifiers to be associated to the MN and indicating such mapping/association to the UE a priori, by explicitly indicating this information to the UE as part of the DCI, and/or by the SN using a "shadow RNTI" or the MN C-RNTI to target the DCI for the UE.

Therefore, in one embodiment, the SN may reserve a subset of its HARQ process identifiers to be associated to the MN and indicating such mapping/association to the UE a priori, e.g., via RRC signaling. That is, the SN may partition the range of HARQ process ID in two sets, where the first set is associated to the MN (e.g., HARQ process ID 0-7), and the remaining part of the IDs (e.g., HARQ process ID 8-15) may be associated to itself (SN). Thus, when the SN sends a TB on HARQ process ID1, the UE knows that HARQ process ID1 is associated to the HARQ buffer of the MN. There may also be a different mapping such that HARQ-ID 1-4 in MN is associated with ID 5-8 in SN. It is noted that URLLC applications may not need many parallel HARQ processes because of their limited delay budget (1 ms). Thus, the partitioning provided by example embodiments may not cause any performance degradation in practice. In one example embodiment, as described above, the NDI is not used for such pre-reserved HARQ process IDs (i.e., according to the embodiment that the UE is only scheduled retransmissions from the SN), and therefore may be used to further distinguish between selected HARQ process IDs in the HARQ process ID space. For instance, in case HARQ processes 14 and 15 are reserved, the additional bit in NDI signaling space may be used to actually indicate HARQ processes 12, 13, 14, and 15.

In another embodiment, the SN may explicitly indicate, to the UE, that an HARQ process ID used by the MN is associated actually to a SN as part of the DCI. For example, the SN may indicate in the DCI containing the scheduling grant of the UE that the transmission is associated to, e.g., the "HARQ process ID1 of MN". According to an embodiment, this approach may utilize a new DCI format, including a new bit to indicate that the HARQ process ID is associated to the "transmitting node" or to a "different node than the transmitting node".

In another embodiment, the SN may use a "shadow RNTI" or the MN C-RNTI to target the DCI for the UE. A DCI which and/or whose CRC is scrambled with such UE ID may indicate implicitly the association of the HARQ process ID value to a different node than the transmitting node.

Figure 4:
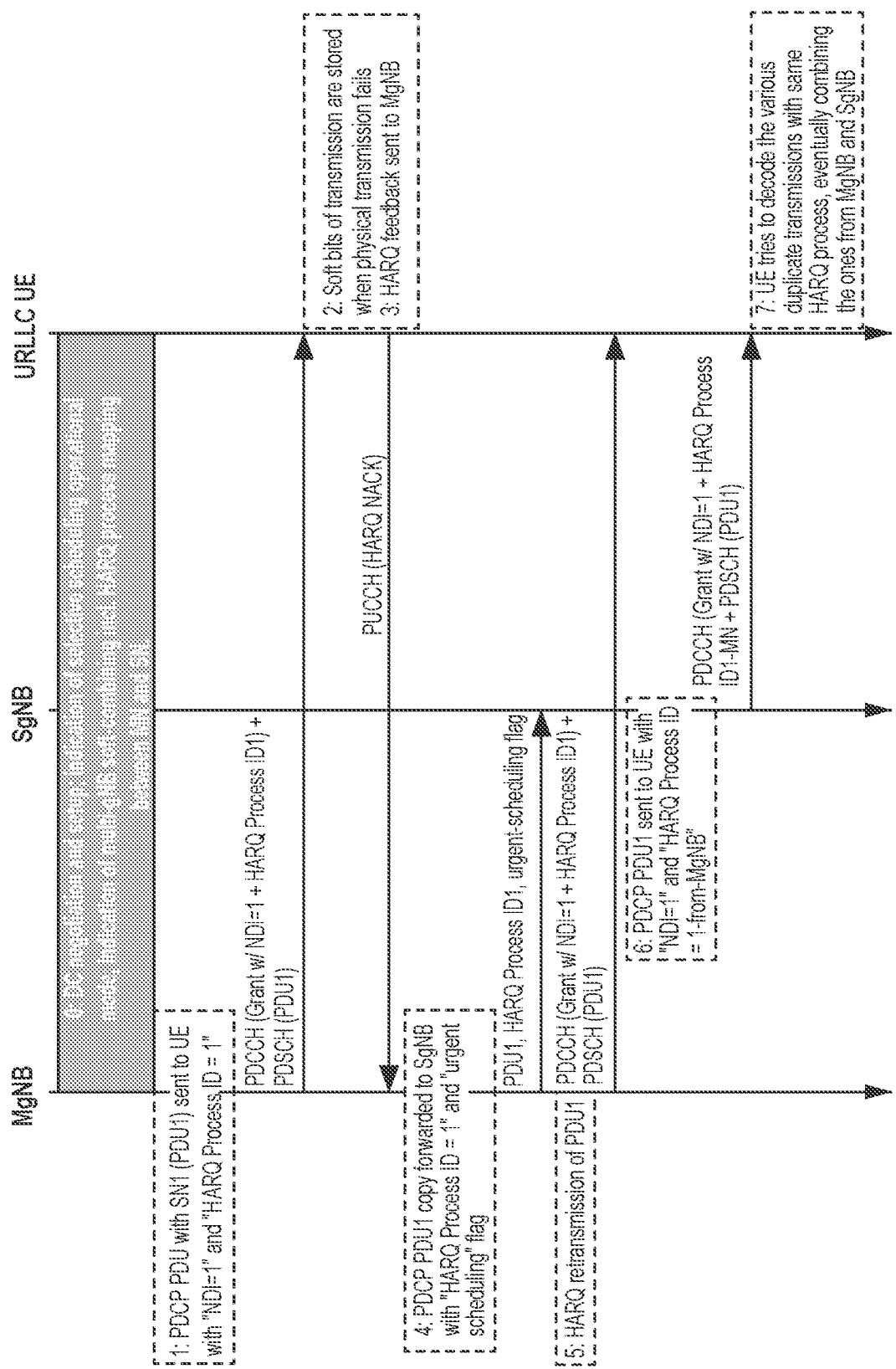
FIG. 4 illustrates an example signaling flow diagram, according to an embodiment.

In one embodiment, a duplicate PDU may be sent to one or more SN(s) including HARQ information used at MN for the same PDU and/or an urgent scheduling request, when the status of the earlier transmission of the PDU to the UE from the MN is known to be "NACK." According to one example, as soon as a transmission failure on the primary link is notified to the MN via HARQ NACK from the UE, the MN may provide the SN with the following information over the X2/Xn interface: i) the PDU duplicate; ii) the pointer to the earlier PHY transmission (i.e., the HARQ process ID associated to the PDU at the first node); and/or iii) an "urgent scheduling" indication. FIG. 4 illustrates an example signaling flow diagram according to this embodiment. According to an example, in case of RAN split architecture in gNB-CU and gNB-DU, dedicated signalling of HARQ information per PDU may be conveyed from the CU to the DU over F1 interface.

According to another embodiment, a duplicate PDU may be sent to one or more SN(s) with a hold-on time and/or HARQ information used at the MN for same PDU. In one example, the SN(s) can prepare corresponding PHY transmission in the related HARQ buffer waiting for further instruction from the MN before the actual transmission. In this embodiment, the PDU may be forwarded by the MN to the SN, together with a "hold-on time" indication. In addition to that, the PDU may be sent along with the HARQ information (e.g., HARQ process ID) associated to the packet copy sent via the MN; this may entail that the PDU transfer can happen when the HARQ information is known (e.g., after some PHY operations take place at MN).

The hold-on time indication can be a transmit timer, which provides a conditional scheduling indication to transmit the PDU if no discarding indication is received before the transmit timer expires. In an embodiment, a discarding indication may be sent rather than an urgent scheduling indication, upon receiving a notification of a transmission success of PDU from the UE.

Figure 5:
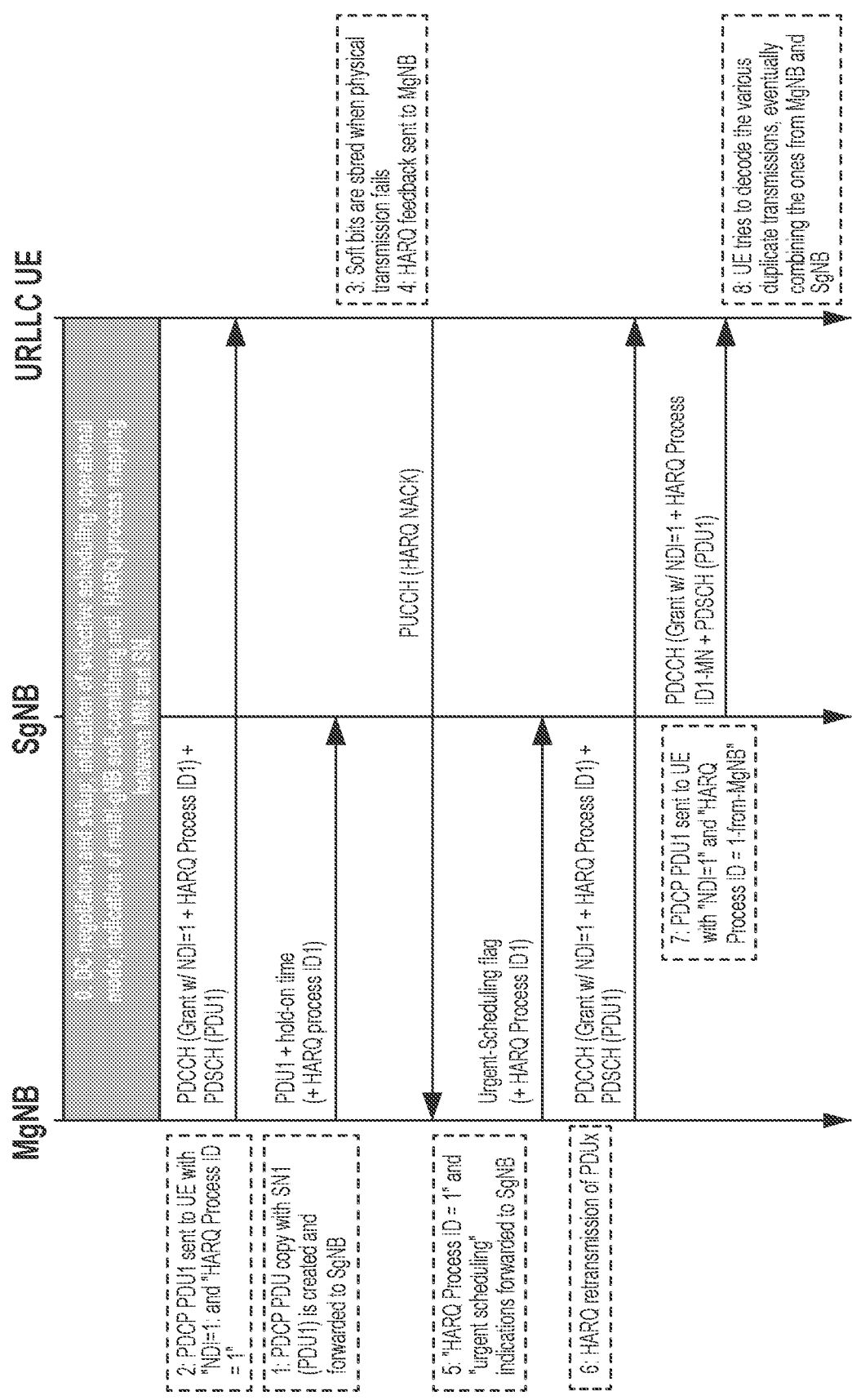
FIG. 5 illustrates an example signaling flow diagram, according to an embodiment.

Upon a transmission failure of the PDU from the MN, the MN may send an "urgent scheduling" indication to the SN. In this embodiment, some PHY layer operations (i.e., making of the TB) may be anticipated to save the corresponding layer 1 (L1) processing delay at the base station, which has a twofold benefit. On one hand, it allows a timelier transmission of the PDU from the SN. On the other hand, it relaxes the timing constraints of selective duplication. It is noted that under the assumption of UE processing capability 2 (URLLC), 2-symbol slot scheduling and 30 kHz subcarrier spacing (SCS), the base station L1 processing delay which can be saved is 0.196 ms (equivalent to 2.7 OFDM symbols), which is rather significant when the total delay budget for URLLC is 1 ms. FIG. 5 illustrates an example signaling flow diagram according to this embodiment.

In yet another embodiment, a duplicate PDU may be sent to one or more SN(s) with a hold-on time and/or HARQ information used at the MN for same PDU; the SN(s) can prepare corresponding PHY retransmission in the related HARQ buffer waiting for HARQ feedback from UE. In this embodiment, the MN may forward the duplicated PDU with a "hold-on time" indication and the HARQ process ID used at the MN as soon as the PDU is assigned to that HARQ process ID. After decoding and determining the outcome of the transmission from the MN, the UE may send HARQ feedback (ACK/NACK) to both the MN and the SN, i.e., multi-cast uplink control information (UCI), since they now "share" the corresponding HARQ process for a transmission. Alternatively, the UE may also be instructed based on configuration to send the HARQ feedback independently to the MN and SN. In case of HARQ NACK, the MN may retransmit the PDU (from the UE perspective this is a first retransmission), while the SN can transmit the PDU for the first time (from the UE perspective this is a second retransmission). In case of received HARQ ACK, the nodes can discard the duplicated PDU, i.e., both nodes can flush the HARQ buffer corresponding to that HARQ process, e.g., whenever new data uses the same HARQ buffer. It is noted that, in this embodiment, there is no need for the "urgent scheduling" indication provided from the MN as such indication is provided to the SN by the UE, which is configured to send the HARQ feedback to both nodes.

Figure 6:
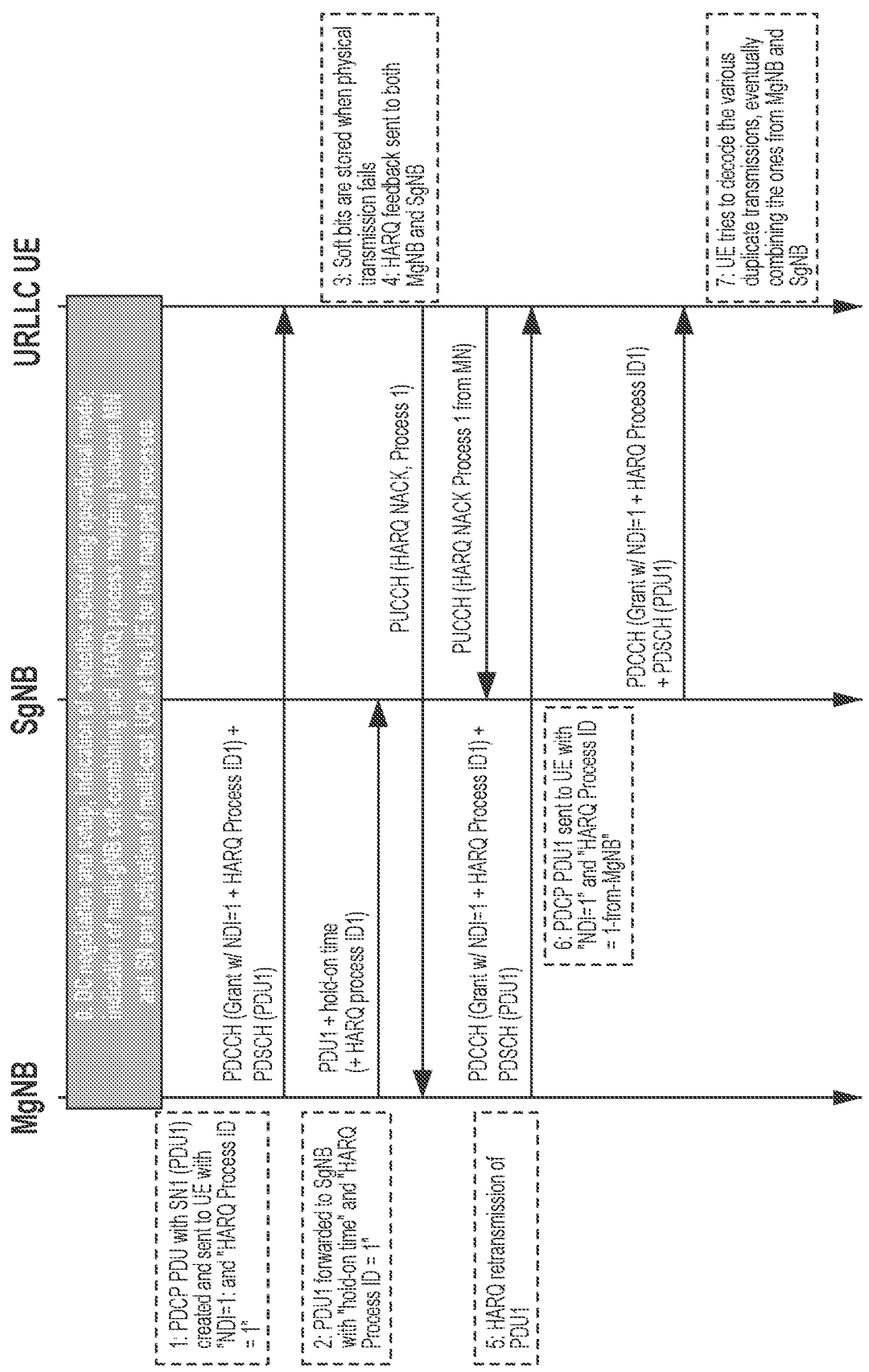
FIG. 6 illustrates an example signaling flow diagram, according to an embodiment.

In order to support this embodiment, it is assumed separate physical uplink control channels (PUCCH) from the UE towards the two nodes, meaning that the UE needs PUCCH resources to be configured by SN for transmitting HARQ ACK/NACK corresponding to MN's transmission(s). The PUCCH allocation can follow implicit timing after a transmission as in regular procedure. Such PUCCH allocation may also be "hardcoded" for this purpose, where the resources may potentially be shared between multiple UEs, but they would be reserved for transmission of HARQ-ACK bits in relation to MN/SN "mirrored" operation. That is, semi-static codebook and transmission on pre-defined resources may be defined. Alternatively, a single PUCCH may be provided relying on the SN to employ an assisting receiver to monitor MN's PUCCH transmissions according to the same timing. If more than one retransmission can be accommodated within a PDU delay budget, the above may be applied to both nodes. That may be relevant considering applications having a more relaxing delay budget than URLLC. FIG. 6 illustrates an example signaling flow diagram according to this embodiment.

It is noted that, as a result of example embodiments, the UE is now able to associate PHY transmissions (TBs) which were received from different nodes to the same HARQ buffer and same PDCP PDU, thus applying combining of soft bits in order to improve the successful decoding probability.

It is noted that according to the example embodiments discussed above, the retransmissions of the PDU from MN and SN may or may not happen at exactly the same time. In case both retransmissions do not happen at the same time, the timing of the HARQ-ACK sent to each node/cell should not be affected, i.e., the HARQ-ACK of a retransmission from the primary node should not be delayed when waiting for a (potential) additional retransmission from the SN to avoid introducing delay. As an alternative, however, the UE could be instructed with rules on whether to delay an HARQ-ACK or not depending, e.g., on the number of retransmissions versus PDU delay budget.

In case both retransmissions happen at the same time, a slightly longer UE processing delay may have to be accounted for as compared to having to decode only one PDU at a time. This additional delay may be similar, however, to the decoding delay when simultaneous transmissions are received according to regular DC operations. It can be anticipated that retransmissions will have the same timing since the instruction/trigger to retransmit is received directly by the UE from both nodes, based on NACK (assuming synchronous deployment).

It is also noted that the soft combining of the retransmissions sent from the first and second nodes may be handled in one entity in the UE, while the channel decoding (Turbo or LDPC) may happen in another (independent) entity of the UE. Hence, in case of receiving more than one retransmission at different time instants, the addition of the soft values may be handled as accumulation in the soft combining unit, while channel decoding is running in parallel.

Furthermore, MAC multiplexing (multiplexing of two or more MAC PDUs in the same transport block) may be at least partially supported by certain embodiments. For example, if the MN sends an earlier physical transmission to the UE (carrying one or more MAC PDUs, so where MAC multiplexing was used), then the MN may send information of such transmission to the SN to allow the SN to prepare the same transport block (to allow retransmit the multiplexed MAC PDU(s)). This assumes that all PDUs multiplexed belong to split DRBs. Such information of the MAC multiplexing may be provided to the SN, to enable that the same MAC multiplexing can take place at the SN. According to some embodiments, in case the MN adopts MAC multiplexing of data not associated to the SN (e.g. MSG bearer), the MN can control that combining is not occurring by avoiding indicating the pointer to the SN.

Figure 7A:
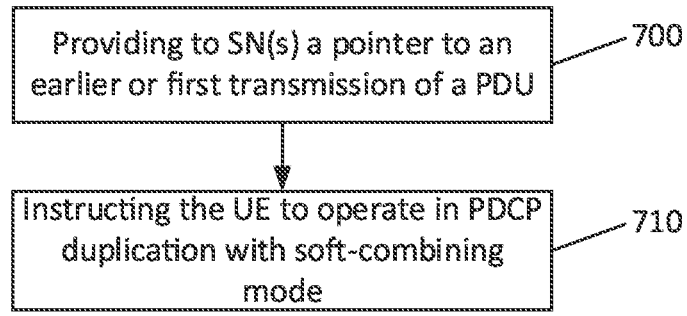
FIG. 7a illustrates an example flow diagram of a method, according to an embodiment.

FIG. 7a illustrates an example flow diagram of a method for supporting packet combining for PDCP duplication, according to one example embodiment. In certain example embodiments, the flow diagram of FIG. 7a may be performed by a network entity or network node in a 3GPP system, such as LTE or 5G NR. For instance, in some example embodiments, the method of FIG. 7a may be performed by a first network node or base station, which may be a MN, MeNB or MgNB as depicted in the example diagrams of FIGS. 4-6. Therefore, in certain embodiments, the method may include any of the steps performed at the MgNB in FIGS. 4-6

As illustrated in the example of FIG. 7a, the method may include, at 700, providing to one or more SNs a pointer to an earlier or first PHY transmission of a PDU. In an embodiment, the pointer may be used by subsequent transmissions of the PDU through the SN(s) to indicate to the UE what transmissions are to be combined. In an embodiment, the providing 700 may include providing the pointer over a X2/Xn interface. According to one embodiment, the pointer may be a HARQ process ID used by the MN for earlier transmission of the PDU. In additional embodiments, the pointer may also include one or more of a RV to be used at the SN, a NDI value used at the MN for the earlier transmission of the PDU, the PDU of the MN for the earlier transmission to the UE to prepare for the SN transmission, and/or a timing/timestamp of transmission from the MN to SN.

According to certain embodiments, when a notification of a transmission failure on a primary link is received by the MN from a UE, the providing 700 may include providing to the SN the PDU duplicate, the pointer to the earlier PHY transmission of the PDU (i.e., the HARQ process ID associated with the PDU at the MN), an urgent scheduling indication and/or failure indication of the PDU.

In another embodiment, the providing 700 may include providing to the SN the PDU duplicate, along with a hold-on time indication, the HARQ information (e.g., HARQ process ID) associated with the PDU duplicate and, upon a transmission failure of the PDU from the MN, sending an urgent scheduling indication to the SN and/or failure indication of the PDU.

In yet another embodiment, the providing 700 may include providing to the SN the PDU duplicate, along with a hold-on time indication and the HARQ process ID used at the MN when the PDU is assigned to that HARQ process ID.

Thus, in some embodiments, the MN can also provide to the SN the used TBS MCS and optionally the number and/or actual used Physical Resource Blocks (PRB) in the earlier transmission in addition to the PDU itself. This information may be used for adapting the scheduling at the SN to make the soft combination simpler or more effective at the UE, e.g., a maximum delta in MCS used for different transmissions in order to be combined.

According to certain embodiments, the method may also include, at 710, instructing the UE to operate in PDCP duplication with soft-combining mode. Thus, in some embodiments, the method of FIG. 7a allows for the appending of new associated information for duplicated PDCP PDUs transferred over the Xn interface that includes a pointer to the corresponding HARQ process used in the earlier transmission, optionally along with an urgent scheduling indication.

Figure 7B:
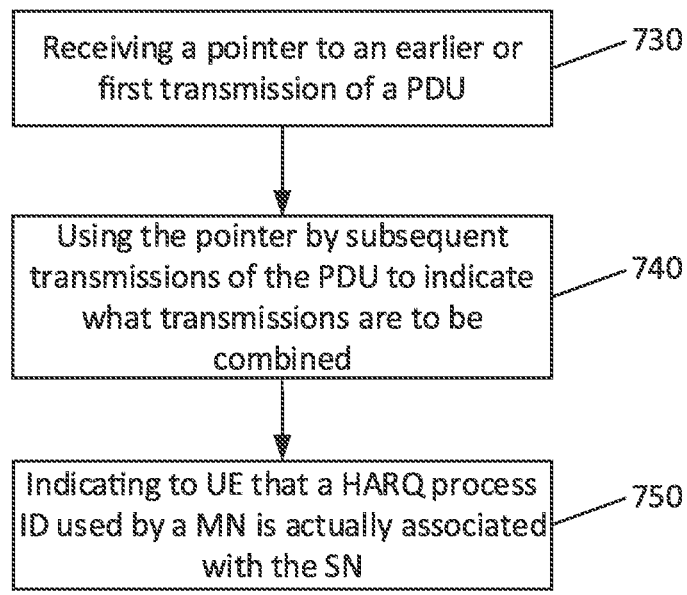
FIG. 7b illustrates an example flow diagram of a method, according to an embodiment.

FIG. 7b illustrates an example flow diagram of a method for supporting packet combining for PDCP duplication, according to one example embodiment. In certain example embodiments, the flow diagram of FIG. 7b may be performed by a network entity or network node in a 3GPP system, such as LTE or 5G NR. For instance, in some example embodiments, the method of FIG. 7b may be performed by a second network node or base station, which may be a SN, SeNB or SgNB as depicted in the example of FIGS. 4-6.

According to one embodiment, the method of FIG. 7b may include, at 730, receiving, from a MN, a pointer to an earlier or first PHY transmission of a PDU. In an embodiment, the method may include, at 740, using the pointer by subsequent transmissions of the PDU through the SN to indicate to the UE what transmissions are to be combined. In an embodiment, the receiving 730 may include receiving the pointer over a X2/Xn interface. According to one embodiment, the pointer may be a HARQ process ID used by the MN for earlier transmission of the PDU. In additional embodiments, the pointer may also include one or more of a RV to be used at the SN, a NDI value used at the MN for the earlier transmission of the PDU, the PDU of the MN for the earlier transmission to the UE to prepare for the SN transmission, and/or a timing/timestamp of transmission from the MN to SN.

According to certain embodiments, when a notification of a transmission failure on a primary link is received by the MN from a UE, the receiving 730 may include receiving the PDU duplicate, the pointer to the earlier PHY transmission of the PDU (i.e., the HARQ process ID associated with the PDU at the MN), an urgent scheduling indication and/or failure indication of the PDU.

In another embodiment, the receiving 730 may include receiving the PDU duplicate, along with a hold-on time indication, the HARQ information (e.g., HARQ process ID) associated with the PDU duplicate and, upon a transmission failure of the PDU from the MN, receiving an urgent scheduling indication and/or failure indication of the PDU from the MN.

In yet another embodiment, the receiving 730 may include receiving the PDU duplicate, along with a hold-on time indication and the HARQ process ID used at the MN when the PDU is assigned to that HARQ process ID.

According to certain embodiments, the example method of FIG. 7b may also include, at 750, indicating to a UE that a HARQ process ID used by a MN is actually associated with the SN. In an embodiment, the indicating 750 may include reserving a subset of the SN's HARQ process IDs to be associated to the MN and indicating this association (or mapping of HARQ process IDs to MN) to the UE. In another embodiment, the indicating 750 may include explicitly indicating the information that the HARQ process ID used by the MN is associated with the SN as part of the DCI. In yet another embodiment, the indicating 750 may include using a shadow RNTI or the MN C-RNTI to target the DCI for the UE.

As a result of the example method of FIG. 7b, a SN may enforce actual urgent scheduling of a retransmission (non-original data) of the PDU transferred by the MN, indicating to the UE the HARQ process ID (associated to the MN) and as received from the MN.

Figure 7C:
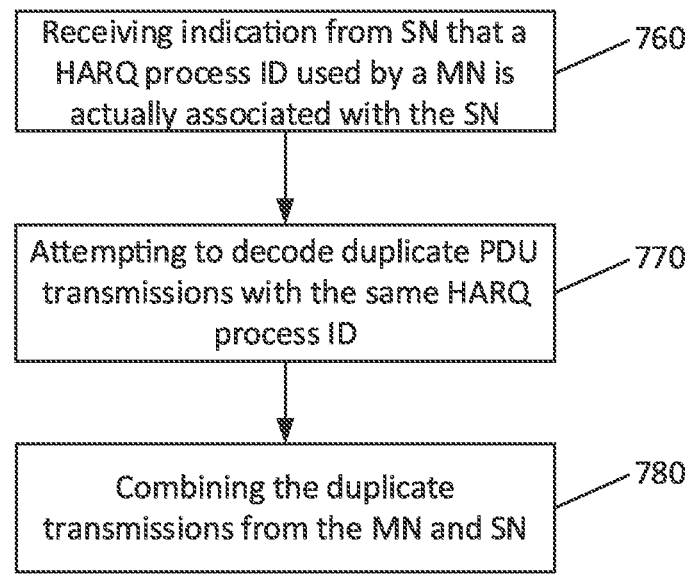
FIG. 7c illustrates an example flow diagram of a method, according to an embodiment.

FIG. 7c illustrates an example flow diagram of a method for supporting packet combining for PDCP duplication, according to one example embodiment. In certain example embodiments, the flow diagram of FIG. 7c may be performed by a UE, mobile equipment (ME), mobile station, mobile device, stationary device, IoT device, or other device. For instance, in some example embodiments, the method of FIG. 7c may be performed by a UE as depicted in the example of FIGS. 4-6.

According to one embodiment, the method of FIG. 7c may include, at 760, receiving an indication from a SN that a HARQ process ID used by a MN is actually associated with the SN. In an embodiment, the receiving 760 may include receiving an indication of an association or mapping of HARQ process IDs to the MN. In another embodiment, the receiving 760 may include receiving an explicit indication of the information that the HARQ process ID used by the MN is associated with the SN as part of the DCI. In yet another embodiment, the receiving 760 may include receiving a shadow RNTI or the MN C-RNTI to target the DCI for the UE.

In an embodiment, the example of FIG. 7c may also include, at 770, attempting to decode duplicate PDU transmissions with the associated HARQ process ID and, at 780, combining the duplicate transmissions from the MN and SN.

Figures 8A, 8B, 8C:
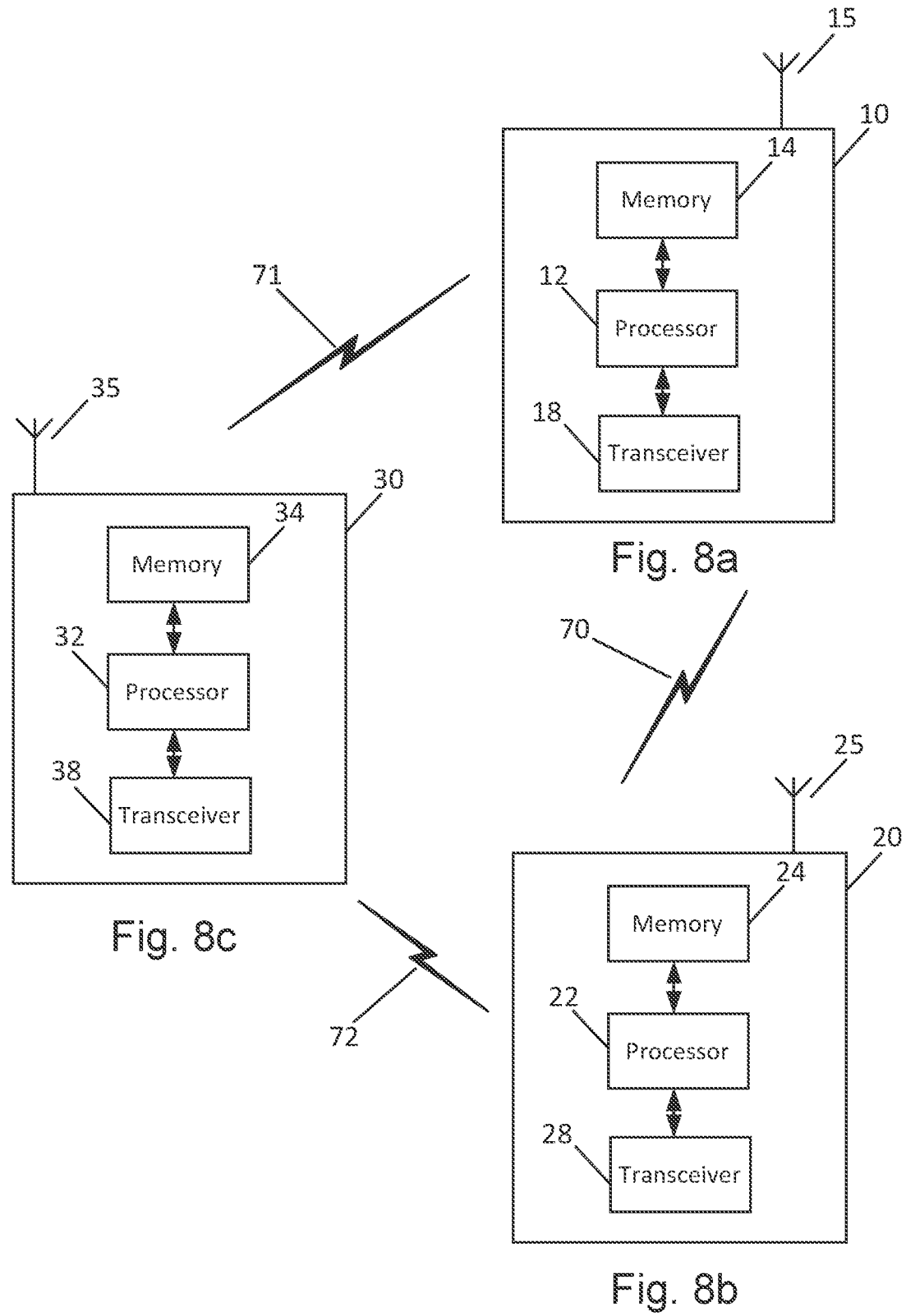
FIG. 8a illustrates an example block diagram of an apparatus, according to an embodiment.
FIG. 8b illustrates an example block diagram of an apparatus, according to an embodiment.
FIG. 8c illustrates an example block diagram of an apparatus, according to an embodiment.

FIG. 8a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), CU of a gNB, or WLAN access point, associated with a radio access network, such as a GSM network, LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 8a.

As illustrated in the example of FIG. 8a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node, RAN node or base station, such as an eNB or gNB, or the like. In one example embodiment, apparatus 10 may be a MeNB or MgNB, for example. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as the signaling diagram illustrated in FIGS. 4-6. For instance, in certain embodiments, apparatus 10 may be configured to perform a procedure for packet combining for PDCP duplication. In one embodiment, the PDCP duplication may include selective duplication.

In one embodiment, apparatus 10 may be controlled by memory 14 and processor 12 to provide to one or more SNs a pointer to an earlier or first PHY transmission of a PDU. In an embodiment, the pointer may be used by subsequent transmissions of the PDU through the SN(s) to indicate to the UE what transmissions are to be combined. In an embodiment, apparatus 10 may be controlled by memory 14 and processor 12 to provide the pointer over a X2/Xn interface. According to one embodiment, the pointer may be a HARQ process ID used by the apparatus 10 for earlier transmission of the PDU. In additional embodiments, the pointer may also include one or more of a RV to be used at the SN, a NDI value used at the MN for the earlier transmission of the PDU, the PDU of the apparatus 10 for the earlier transmission to the UE to prepare for the SN transmission, and/or a timing/timestamp of transmission from the apparatus 10 to SN.

According to certain embodiments, when a notification of a transmission failure on a primary link is received by the apparatus 10 from a UE, apparatus 10 may be controlled by memory 14 and processor 12 to provide to the SN the PDU duplicate, the pointer to the earlier PHY transmission of the PDU (i.e., the HARQ process ID associated with the PDU at the apparatus 10), an urgent scheduling indication and/or failure indication of the PDU.

In another embodiment, apparatus 10 may be controlled by memory 14 and processor 12 to provide to the SN the PDU duplicate, along with a hold-on time indication, the HARQ information (e.g., HARQ process ID) associated with the PDU duplicate and, upon a transmission failure of the PDU from the apparatus 10, to send an urgent scheduling indication and/or failure indication of the PDU to the SN.

In yet another embodiment, apparatus 10 may be controlled by memory 14 and processor 12 to provide to the SN the PDU duplicate, along with a hold-on time indication and the HARQ process ID used at the apparatus 10 when the PDU is assigned to that HARQ process ID.

FIG. 8*b* illustrates an example of an apparatus 20 according to another example embodiment. In example embodiments, apparatus 20 may be a node or server associated with a radio access network, such as a LTE network, 5G or NR or other radio systems which might benefit from an equivalent procedure. For example, in certain embodiments, apparatus 20 may include a base station, a Node B, an evolved Node B (eNB), 5G Node B or access point, next generation Node B (NG-NB or gNB), CU of a gNB, or WLAN access point, associated with a radio access network, such as a GSM network, LTE network, 5G or NR.

In some example embodiments, apparatus 20 may include one or more processors, one or more computer-readable storage medium (for example, memory, storage, or the like), one or more radio access components (for example, a modem, a transceiver, or the like), and/or a user interface. In some example embodiments, apparatus 20 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 20 may include components or features not shown in FIG. 8*b*.

As illustrated in the example of FIG. 8*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8*b*, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an example embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, in one example embodiment, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some example embodiments, apparatus 10 may include an input and/or output device (I/O device). In certain examples, apparatus 20 may further include a user interface, such as a graphical user interface or touchscreen.

In an example embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR. For instance, in an example embodiment, link 70 may represent an Xn or X2 interface.

According to some example embodiments, processor 22 and memory 24 may be included in or may form a part of processing circuitry or control circuitry. In addition, in some example embodiments, transceiver 28 may be included in or may form a part of transceiving circuitry.

As discussed above, according to example embodiments, apparatus 20 may be a network node or functions, such as an authentication server or function. According to certain examples, apparatus 20 may be controlled by memory 24 and processor 22 to perform the functions associated with example embodiments described herein. For instance, in some example embodiments, apparatus 20 may be configured to perform one or more of the processes depicted in any of the diagrams or signaling flow diagrams described herein, such as those illustrated in FIGS. 4-6. As an example, apparatus 20 may be a secondary network node, SeNB or SgNB, for instance. In example embodiments, apparatus 20 may be configured to perform a procedure of packet combining for PDCP duplication. In one embodiment, the PDCP duplication may include selective duplication.

According to certain embodiments, apparatus 20 may be controlled by memory 24 and processor 22 to receive, from a MN, a pointer to an earlier or first PHY transmission of a PDU. In an embodiment, apparatus 20 may be controlled by memory 24 and processor 22 to use the pointer by subsequent transmissions of the PDU through the apparatus 20 to indicate to the UE what transmissions are to be combined. In an embodiment, apparatus 20 may be controlled by memory 24 and processor 22 to receive the pointer over a X2/Xn interface. According to one embodiment, the pointer may be a HARQ process ID used by the MN for earlier transmission of the PDU. In additional embodiments, the pointer may also include one or more of a RV to be used at the apparatus 20, a NDI value used at the MN for the earlier transmission of the PDU, the PDU of the MN for the earlier transmission to the UE to prepare for the transmission by apparatus 20, and/or a timing/timestamp of transmission from the MN to apparatus 20.

According to certain embodiments, when a notification of a transmission failure on a primary link is received by the MN from a UE, apparatus 20 may be controlled by memory 24 and processor 22 to receive the PDU duplicate, the pointer to the earlier PHY transmission of the PDU (i.e., the HARQ process ID associated with the PDU at the MN), and/or an urgent scheduling indication.

In another embodiment, apparatus 20 may be controlled by memory 24 and processor 22 to receive the PDU duplicate, along with a hold-on time indication, the HARQ information (e.g., HARQ process ID) associated with the PDU duplicate and, upon a transmission failure of the PDU from the MN, to receive an urgent scheduling indication from the MN.

In yet another embodiment, apparatus 20 may be controlled by memory 24 and processor 22 to receive the PDU duplicate, along with a hold-on time indication and the HARQ process ID used at the MN when the PDU is assigned to that HARQ process ID.

According to certain embodiments, apparatus 20 may be controlled by memory 24 and processor 22 to indicate to a UE that a HARQ process ID used by a MN is actually associated with the apparatus 20. In an embodiment, apparatus 20 may be controlled by memory 24 and processor 22 to reserve a subset of the HARQ process IDs of apparatus 20 to be associated to the MN and indicating this association (or mapping of HARQ process IDs to MN) to the UE. In another embodiment, apparatus 20 may be controlled by memory 24 and processor 22 to explicitly indicate the information that the HARQ process ID used by the MN is associated with the apparatus 20 as part of the DCI. In yet another embodiment, apparatus 20 may be controlled by memory 24 and processor 22 to use a shadow RNTI or the MN C-RNTI to target the DCI for the UE.

FIG. 8c illustrates an example of an apparatus 30 according to another example embodiment. In an example embodiment, apparatus 30 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, a connected car, or the like. As one example, apparatus 30 may be implemented in, for instance, a wireless handheld device, a wireless plug-in accessory, or the like.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 8c.

As illustrated in the example of FIG. 8c, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 8*c*, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be a UE, mobile device, mobile station, ME, IoT device and/or NB-IoT device, for example. According to certain example embodiments, apparatus 30 may be controlled by memory 34 and processor 32 to perform the functions associated with example embodiments described herein. For instance, in some embodiments, apparatus 30 may be configured to perform one or more of the processes depicted in any of the diagrams or signaling flow diagrams described herein. As an example, apparatus 30 may correspond to one or more of the UE(s) illustrated in FIGS. 4-6.

According to certain embodiments, apparatus 30 may be controlled by memory 34 and processor 32 to receive an indication from a SN that a HARQ process ID used by a MN is actually associated with the SN. In an embodiment, apparatus 30 may be controlled by memory 34 and processor 32 to receive an indication of an association or mapping of HARQ process IDs to the MN. In another embodiment, apparatus 30 may be controlled by memory 34 and processor 32 to receive an explicit indication of the information that the HARQ process ID used by the MN is associated with the SN as part of the DCI. In yet another embodiment, apparatus 30 may be controlled by memory 34 and processor 32 to receive a shadow RNTI or the MN C-RNTI to target the DCI for the UE.

In an embodiment, apparatus 30 may be controlled by memory 34 and processor 32 to attempt to decode duplicate PDU transmissions with the same HARQ process ID, and to combine the duplicate transmissions from the MN and SN.

Therefore, certain example embodiments provide several technical improvements, enhancements, and/or advantages. For example, certain embodiments provide a HARQ process coupling between the MN and the SN, so that a UE can realize that packets coming from different radio links are duplicated already at PHY (instead of at PDCP) and thus combine them in a flexible/configurable way that may maximize the successful decoding probability.

As a result, some embodiments allow for a light coordinated transmission without incurring in the signaling and coordination overhead that is typically associated with it (CoMP, SFN, etc.). Consequently, example embodiments improve the SINR and the reliability of URLLC transmissions, enable efficient PDCP packet duplication as a baseline, even when JT-CoMP is not possible, improve the overall network efficiency. Furthermore, some embodiments, are applicable to both the DC/MC scenario (e.g., Xn-based) as well as to the cases where PDCP duplication is used in conjunction with CA, or a combination of CA and DC. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with steps in a different order, and/or with hardware elements in configurations which are different than those which are disclosed. Therefore, although some embodiments have been described based upon these examples preferred embodiments, it would be apparent to those of skill in the art that certain modifications, variations, and alternative constructions would be apparent, while remaining within the spirit and scope of example embodiments.

A first embodiment is directed to a method that may be performed by a first node. The method may include providing to one or more second node(s) a pointer to an earlier or first transmission of a PDU.

According to a variant, the method may be performed by a network node (e.g., gNB) operating in a functional split in which the network node may include a control unit (gNB-CU) and a plurality of distributed units (gNB-DUs), where each DU may be associated with a component carrier. In this example, the method may include the CU or a DU providing the pointer to one or more of the DUs or vice versa over a F1 interface. Therefore, in some examples discussed herein, the first node may represent a gNB-CU or a gNB-DU, and the second node may represent one or more gNB-DUs.

In a variant, the pointer may be used by subsequent transmissions of the PDU through the second node(s) to indicate to the UE what transmissions are to be combined. In a variant, the providing may include providing the pointer to the second node(s) over a X2 and/or Xn and/or F1 interface. According to a variant, the pointer may be a HARQ process ID used by the first node for earlier transmission(s) of the PDU. In additional variants, the pointer may also include one or more of a RV to be used at the second node(s), a NDI value used at the first node for the earlier transmission of the PDU, the PDU of the first node for the earlier transmission to the UE to prepare for the second node transmission, and/or a timing/timestamp of transmission from the first node to the second node(s).

According to some variants, when a notification of a transmission failure of the PDU is received by the first node from the UE, the providing may include providing to the second node(s) the PDU duplicate, the pointer to the earlier PHY transmission of the PDU, an urgent scheduling indication, and/or failure indication of the PDU.

In another variant, the providing may include providing to the second node(s) the PDU duplicate, along with a hold-on time indication, the HARQ information associated with the PDU duplicate and, upon a transmission failure of the PDU from the first node, sending an urgent scheduling indication to the second node(s) and/or failure indication of the PDU.

In yet another variant, the method may include the first node sending a UE's PUCCH configuration(s) to the second node, allowing a UCI with failure indication over the first node's PUCCH to be received at the first node and second node from the UE.

In another variant, the method may include determining and/or selecting which HARQ process IDs the first node will use for the UE and indicating the selected HARQ process IDs to the second node.

In a variant, for the cases when RLC segmentation occurs at the first node, the method may include providing information about the segmentation and the RLC sequence number over Xn, X2 and/or F1 interface to the second node.

In a variant, in cases where MAC multiplexing was used, the method may include providing information on the MAC multiplexing to the second node to enable the same MAC multiplexing to take place at the second node.

According to some variants, the method may also include instructing the UE to operate in PDCP duplication with soft-combining mode.

A second embodiment is directed to a method that may be performed by a second node. The method may include receiving, from a first node, a pointer to an earlier or first transmission of a PDU. The method may include using the pointer by subsequent transmissions of the PDU through the second node to indicate to the UE what transmissions are to be combined.

In a variant, the receiving may include receiving the pointer over a X2 and/or Xn and/or F1 interface. According to a variant, the pointer may be a HARQ process ID used by the first node for earlier transmission of the PDU. In additional variants, the pointer may also include one or more of a RV to be used at the second node, a NDI value used at the first node for the earlier transmission of the PDU, the PDU of the first node for the earlier transmission to the UE to prepare for the second node transmission, and/or a timing/timestamp of transmission from the first node to the second node.

According to a variant, when a notification of a transmission failure on a primary link is received by the first node from a UE, the receiving may include receiving the PDU duplicate, the pointer to the earlier transmission of the PDU, an urgent scheduling indication, and/or failure indication of the PDU.

In another variant, the receiving may include receiving the PDU duplicate, along with a hold-on time indication, the HARQ information associated with the PDU duplicate and, upon a transmission failure of the PDU from the first node, receiving an urgent scheduling indication from the first node, and/or failure indication of the PDU.

In another variant, the receiving may include receiving the PDU duplicate, along with a hold-on time indication and the HARQ process ID used at the first node when the PDU is assigned to that HARQ process ID.

According to a variant, the method may also include indicating to a UE that a HARQ process ID used by the first node is actually associated with the second node. In a variant, the indicating may include reserving a subset of the second node's HARQ process IDs to be associated to HARQ process IDs received from the first node, mapping first node's HARQ process IDs to the second node's HARQ process IDs, and indicating this mapping of HARQ process IDs to the UE.

In another variant, the indicating may include explicitly indicating the information that the HARQ process ID used by the first node is associated with the second node as part of the DCI. In yet another variant, the indicating may include using a shadow RNTI or the first node C-RNTI to target the DCI for the UE.

In yet another variant, the method may include the second node receiving, from the first node, a UE's PUCCH configuration(s), allowing a UCI with failure indication over the first node's PUCCH to be received at the first node and second node from the UE.

In another variant, the method may include the second node receiving an indication of which HARQ process IDs the first node will use for the UE.

In a variant, for the cases when RLC segmentation occurs at the first node, the method may include the second node receiving information about the segmentation and the RLC sequence number over the Xn, X2 and/or F1 interface.

In a variant, in cases where MAC multiplexing was used, the method may include the second node receiving information on the MAC multiplexing from the first node to enable the same MAC multiplexing to take place at the second node.

In a variant, the method may include the second node receiving the UE's PUCCH configurations from the first node and, based on the received PUCCH configuration, the second node listening to the UCI with failure indication sent by the UE over the first node's PUCCH.

In a further variant, in a case where the UE sends two UCIs, the method may include the second node assigning PUCCH resources to the UE associated to transmissions from the first node.

In another variant, the method may include the second node receiving, from the first node, the UE's PUCCH configurations and adopting a second receiver to listen to the first node's PUCCH.

A third embodiment is directed to a method that may be performed by a UE. The method may include receiving an indication from a second node that a HARQ process ID used by a first node is actually associated with the second node.

In a variant, the receiving may include receiving an indication of an association or mapping of HARQ process IDs to the first node. In another variant, the receiving may include receiving an explicit indication of the information that the HARQ process ID used by the first node is associated with the second node as part of the DCI. In another variant, the receiving may include receiving a shadow RNTI or the first node C-RNTI to target the DCI for the UE. In some variants, the receiving may also include receiving an indication to associate the shadow RNTI with the first node, before using the shadow RNTI to target the DCI.

In a variant, the method may include monitoring the DCI sent by the second node targeted to (scrambled with) the shadow RNTI. This may be done in addition to monitoring for potential DCIs targeted to the UE identifiers specific to the second node (e.g., the second node's C-RNTI).

In a variant, the method may also include attempting to decode duplicate PDU transmission(s) received from the second node having an HARQ process ID associated with the first node, and combining said duplicate transmissions from the second node with duplicate transmissions received from the first node with an associated HARQ process ID.

In a variant, the method may also include the UE sending one UCI with failure indication over the first node's PUCCH. In this case, the second node may adopt a second receiver to listen to the first node's PUCCH. For this, the first node may send the UE's PUCCH configurations to the second node.

In a variant, the method may also include the UE sending two UCI with failure indication, with one UCI being sent over the first node's PUCCH and one UCI being sent over the second node's PUCCH. In this case, the UE may have been configured, by the second node, with PUCCH resources associated to the transmissions of the first node.

A fourth embodiment is directed to an apparatus including at least one processor and at least one memory comprising computer program code. The at least one memory and computer program code may be configured, with the at least one processor, to cause the apparatus at least to perform the method according to the first embodiment, the second embodiment or third embodiment, or any of their variants.

A fifth embodiment is directed to an apparatus that may include circuitry configured to perform the method according to the first embodiment, the second embodiment or third embodiment, or any of the variants discussed above.

A sixth embodiment is directed to an apparatus that may include means for performing the method according to the first embodiment, the second embodiment or third embodiment, or any of the variants discussed above.

A seventh embodiment is directed to a computer readable medium comprising program instructions stored thereon for performing at least the method according to the first embodiment, the second embodiment or third embodiment, or any of the variants discussed above.

We claim:

1. An apparatus, comprising:
   at least one processor; and
   at least one memory including computer program code, where the at least one memory and the computer program code are configured, with the at least one processor, to cause the apparatus to at least:
   receive from a first node, a pointer to an earlier or first transmission of a protocol data unit; and
   use the pointer for subsequent transmissions of the protocol data unit through the apparatus to indicate to a user equipment what transmissions are to be combined, wherein the pointer comprises a hybrid automatic repeat request process identifier used by the first node for the earlier or first transmission of the protocol data unit.

2. The apparatus according to claim 1, wherein the pointer is received over at least one of a X2 interface, Xn interface, or F1 interface.

3. The apparatus according to claim 1, wherein the pointer comprises at least one of a redundancy version to be used at the apparatus, a new data indicator value used at the first node for the earlier transmission of the protocol data unit, a duplicate of the protocol data unit for the earlier or first transmission to the user equipment, or a timing of transmission from the first node to the apparatus.

4. The apparatus according to claim 1, wherein the at least one memory and the computer program code are configured, with the at least one processor, to cause the apparatus to:
receive at least one of a protocol data unit duplicate, an urgent scheduling indication, or a failure indication of the protocol data unit.

5. The apparatus according to claim 1, wherein the at least one memory and the computer program code are configured, with the at least one processor, to cause the apparatus to receive a duplicate of the protocol data unit along with a hold-on time indication, and/or a hybrid automatic repeat request information associated with the protocol data unit duplicate and, upon a transmission failure of the protocol data unit from the first node, receive at least one of an urgent scheduling indication from the first node or failure indication of the protocol data unit.

6. The apparatus according to claim 1, wherein the at least one memory and the computer program code are configured, with the at least one processor, to cause the apparatus to receive an indication of which hybrid automatic repeat request process identifiers the first node will use for the user equipment.

7. The apparatus according to claim 1, wherein the at least one memory and the computer program code are configured, with the at least one processor, to cause the apparatus to indicate to the user equipment that the hybrid automatic repeat request process identifier used by the first node is associated with the apparatus.

8. The apparatus according to claim 7, wherein when indicating, the at least one memory and the computer program code are configured, with the at least one processor, to cause the apparatus to:
   reserve a subset of hybrid automatic repeat request process identifiers of the apparatus to be associated to hybrid automatic repeat request process identifiers received from the first node;
   map the first node's hybrid automatic repeat request process identifiers to the subset of hybrid automatic repeat request process identifiers of the apparatus; and
   indicate the mapping of hybrid automatic repeat request process identifiers to the user equipment.

9. The apparatus according to claim 7, wherein when indicating, the at least one memory and the computer program code are configured, with the at least one processor, to cause the apparatus to:
   explicitly indicate the information that the hybrid automatic repeat request process identifier used by the first node is associated with the apparatus as part of a downlink control information; and
   use a shadow radio network temporary identifier or the first node cell-radio network temporary identifier to target the downlink control information for the user equipment.

10. The apparatus according to claim 1, wherein the at least one memory and the computer program code are configured, with the at least one processor, to cause the apparatus to receive, from the first node, a user equipment's physical uplink control channel configurations, allowing a uplink control information with failure indication over the first node's physical uplink control channel to be received at the apparatus from the user equipment.

11. The apparatus according to claim 1, wherein, for cases when radio link control segmentation occurs at the first node, the at least one memory and the computer program code are configured, with the at least one processor, to cause the apparatus to receive information about the segmentation and a radio link control sequence number over at least one of a Xn interface, X2 interface, or F1 interface.

12. The apparatus according to claim 1, wherein, in cases where medium access control multiplexing was used, the at least one memory and the computer program code are configured, with the at least one processor, to cause the apparatus to receive information on the medium access control multiplexing from the first node to enable the same medium access control multiplexing to take place at the apparatus.

13. The apparatus according to claim 1, wherein, in a case where the user equipment sends two uplink control information, the at least one memory and the computer program code are configured, with the at least one processor, to cause the apparatus to assign physical uplink control channel resources to the user equipment associated to transmissions from the first node.

* * * * *